United States Patent
Choi et al.

(10) Patent No.: US 7,846,605 B2
(45) Date of Patent: Dec. 7, 2010

(54) PUMP HAVING NOISE-PROOF AND VIBRATION-PROOF STRUCTURE AND FUEL CELL SYSTEM USING THE SAME

(75) Inventors: Sang Hyeon Choi, Yongin-si (KR); Jong Ki Lee, Yongin-si (KR); Won Hyouk Jang, Yongin-si (KR); Jun Won Suh, Yongin-si (KR); Dong Yun Lee, Yongin-si (KR); Ri A Ju, Yongin-si (KR); Eun Suk Cho, Yongin-si (KR); Jin Hong An, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 1248 days.

(21) Appl. No.: 11/368,600

(22) Filed: Mar. 7, 2006

(65) Prior Publication Data
US 2006/0216569 A1    Sep. 28, 2006

(30) Foreign Application Priority Data
Mar. 7, 2005    (KR)    .................... 10-2005-0018840

(51) Int. Cl.
*H01M 8/04* (2006.01)
(52) U.S. Cl. .................. 429/452; 429/507; 429/512
(58) Field of Classification Search ............ 429/12–13, 429/34–39
See application file for complete search history.

(56) References Cited

U.S. PATENT DOCUMENTS 3,879,024 A * 4/1975 Scott et al. ............... 267/140.4

(Continued)

FOREIGN PATENT DOCUMENTS

JP    09-088821    3/1997

(Continued)

OTHER PUBLICATIONS

Office action from Japanese Patent Office issued in Applicant's corresponding Japanese Patent Application No. 2005-296700 dated Jun. 9, 2009 and Request for Entry of the Office Action.

*Primary Examiner*—Dah-Wei D Yuan
*Assistant Examiner*—Jacob Buchanan
(74) *Attorney, Agent, or Firm*—Robert E. Bushnell, Esq.

(57) ABSTRACT

There are provided a pump of a noise suppression and vibration proof structure and a fuel cell system using the same. The fuel cell system includes at least one electricity generator including an electrolyte membrane and an anode and a cathode attached to the both surfaces of the electrolyte membrane to generate electricity energy by the electrochemical reaction between fuel containing hydrogen and oxidant supplied to the anode and the cathode, a fuel supplying unit including a pump for supplying the oxidant to the electricity generator, and a fixed frame that is provided on a lower frame and to which the pump is fixed. The pump is separated from the lower frame and is fixed to and combined with the fixed frame by the belt-shaped fixing member on the side surface of the fixing frame with a buffering member interposed. Therefore, it is possible to reduce the noise and vibration of the pump.

12 Claims, 4 Drawing Sheets

U.S. PATENT DOCUMENTS

| | | | |
|---|---|---|---|
| 5,268,240 A * | 12/1993 | Miyama | 429/23 |
| 5,607,133 A * | 3/1997 | Markham et al. | 248/313 |
| 6,158,975 A | 12/2000 | Dill et al. | |
| 6,303,244 B1 * | 10/2001 | Surampudi et al. | 429/17 |
| 6,308,999 B1 | 10/2001 | Tani et al. | |
| 2003/0216153 A1 | 11/2003 | Goilioto | |
| 2006/0210859 A1 | 9/2006 | Choi et al. | |
| 2007/0054159 A1 | 3/2007 | Ryoichi et al. | |
| 2007/0212577 A1 * | 9/2007 | Okuyama et al. | 429/19 |

FOREIGN PATENT DOCUMENTS

| | | |
|---|---|---|
| JP | 09-259912 | 10/1997 |
| JP | 11-281250 | 10/1999 |
| JP | 2000-283098 | 10/2000 |
| JP | 2001-320854 | 11/2001 |
| JP | 2003-208915 | 7/2003 |
| JP | 2003-297409 | 10/2003 |
| JP | 2004-162671 | 6/2004 |
| JP | 2004-214004 | 7/2004 |
| JP | 2004-281130 | 10/2004 |
| JP | 2004-288496 | 10/2004 |
| JP | 2004-303536 | 10/2004 |
| JP | 2004-303705 | 10/2004 |
| JP | 2005-044621 | 2/2005 |
| JP | 2007-512679 | 5/2007 |
| WO | WO 2004/088781 | 10/2004 |
| WO | WO 2005095204 A1 * | 10/2005 |

* cited by examiner

PUMP HAVING NOISE-PROOF AND VIBRATION-PROOF STRUCTURE AND FUEL CELL SYSTEM USING THE SAME

CROSS-REFERENCE TO RELATED APPLICATIONS AND CLAIM OF PRIORITY

This application claims the benefit of Korean Patent Application No. 2005-18840, filed on Mar. 7, 2005 with the Korean Intellectual Property Office, the disclosure of which is incorporated herein by reference. This application is related to application Ser. No. 11/368,599 filed on the same date as this application, entitled "PUMP HAVING NOISE-PROOF AND VIBRATION-PROOF STRUCTURE AND FUEL CELL SYSTEM USING THE SAME", the disclosure of which is incorporated herein by reference.

BACKGROUND

1. Field of the Invention

The present invention relates to a pump and a fuel cell system using the same, and more particularly to, a pump having a noise suppression and vibration proof structure capable of significantly reducing vibration and noise caused by the pump through the improvement of a fixed structure and a pump housing structure and a fuel cell system using the same.

2. Discussion of Related Art

A fuel cell is a power generation system for directly converting chemically reactive energy of hydrogen and oxygen contained in hydrocarbon series material such as methanol, ethanol, and natural gas into electric energy.

The fuel cell is divided into a phosphoric acid fuel cell, a molten carbonate fuel cell, a solid oxide fuel cell, a polymer electrolyte membrane fuel cell, and an alkaline fuel cell in accordance with the kind of used electrolyte. Each fuel cell operates by the same principle, however, varies with the kind of used fuel, operation temperature, catalyst, and electrolyte.

Among the above fuel cells, the polymer electrolyte membrane fuel cell (PEMFC) has an output characteristic remarkably higher than the output characteristics of the other fuel cells, operates at low temperature, has fast starting and response characteristics, and is widely used for a dispersive power source such as a static power station of a house and a public building as well as a portable power source such as a portable electronic apparatus and a transportable power source such as a vehicle power source.

The above-described PEMFC includes a stack, a reformer, a fuel tank, and a fuel pump. The PEMFC supplies the fuel in the fuel tank to the reformer by the operation of the fuel pump. The reformer reforms the fuel to generate hydrogen gas. In the stack, the hydrogen gas and the oxygen electrochemically react to generate electric energy.

Also, the fuel cells include a direct methanol fuel cell (DMFC) that is similar to the PEMFC and that can directly supply liquid methanol fuel to the stack. Since the DMFC does not use the reformer unlike the PEMFC, it is advantageous to making the size of the DMFC small.

The fuel cell stack commonly has a structure in which several or several tens of unit fuel cells each comprised of a membrane electrode assembly (MEA) and a separator are stacked. Here, the MEA has a structure in which an anode (also referred to as a negative electrode) and a cathode (also referred to as a positive electrode) are attached to each other with a polymer electrolyte membrane interposed. The fuel cell stack is compressed and sealed up in order to remove non-uniform operation conditions such as the pressure drop in the stack or the decrease of the concentration of oxygen. FIG. 1 schematically illustrates the operation principle of a common fuel cell including the polymer electrolyte membrane. Referring to FIG. 1, a MEA 20 of a fuel cell 10 includes a polymer electrolyte membrane 12, an anode catalyst layer 14, and a cathode catalyst layer 16. When the fuel containing the hydrogen gas or hydrogen is supplied to the anode catalyst layer 14 in the fuel cell 10, electrochemical oxidation occurs in the anode catalyst layer 14 so that ionization and oxidation are performed to generate hydrogen ions H$^+$ and electrons e$^-$. The ionized hydrogen ions are transmitted from the anode catalyst layer 14 to the cathode catalyst layer 16 through the polymer electrolyte membrane 12. The electrons are transmitted from the anode catalyst layer 14 to the cathode catalyst layer 16 through an external wiring line 18. The hydrogen ions transmitted to the cathode catalyst layer 16 perform electrochemical reduction on the oxygen supplied to the cathode catalyst layer 16 to generate heat and water. Electrical energy is generated by the transmission of the electrons.

The electrochemical reactions of the PEMFC and the DMFC will be represented as follows in EQUATIONS 1 and 2, respectively.

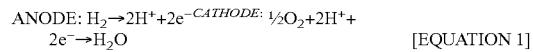

$$\text{ANODE: } H_2 \rightarrow 2H^+ + 2e^{-} \quad \text{CATHODE: } \tfrac{1}{2}O_2 + 2H^+ + 2e^{-} \rightarrow H_2O \qquad \text{[EQUATION 1]}$$

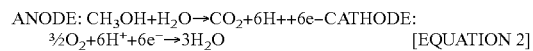

$$\text{ANODE: } CH_3OH + H_2O \rightarrow CO_2 + 6H^+ + 6e^- \text{-CATHODE: } \tfrac{3}{2}O_2 + 6H^+ + 6e^- \rightarrow 3H_2O \qquad \text{[EQUATION 2]}$$

The fuel cell system may be divided into an active fuel cell system that supplies fuel and air containing hydrogen to a fuel cell stack through the operation of a fuel pump and an air pump and a passive fuel cell system that supplies fuel or air without using a pump.

The output of the active fuel cell system is higher than the output of the passive fuel cell system. However, since the fuel cell stack is compressed and sealed up with a plurality of fuel cells stacked, the fuel cell stack has predetermined internal pressure. Therefore, in order to supply an enough amount of air to the fuel cell stack with the predetermined internal pressure considering oxygen depletion, a high output air pump must be used. As described above, the high output air pump must be used for the conventional active fuel cell system so that large noise and vibration are generated.

Also, the conventional active fuel cell system commonly includes at least one fuel pump other than the air pump. In this case, the fuel pump in the conventional active fuel cell system additionally generates noise and vibration.

The noise and vibration of the pumps causes user to be discomfort during the continuous operation of the fuel cell.

Furthermore, when the active fuel cell system is used as a power source supply device of each of electronic apparatuses such as a notebook computer, a portable multimedia player (PMP), a portable digital video disc (DVD) player, a personal digital assistant (PDA), a mobile telephone, and a camcorder, the noise and vibration of the fuel cell system make users uncomfortable. Therefore, in order to make the users comfortable and to facilitate the use of the electronic apparatuses, the generation of the noise of the fuel cell must be prevented.

SUMMARY OF THE INVENTION

Accordingly, it is an object of the present invention to provide a fuel system with a noise suppression and vibration proof structure.

Accordingly, it is an object of the present invention to provide a fuel cell system that fixes pumps to the side surface and the top surface of a fixed frame to absorb the vibration of the pumps.

It is another object of the present invention to provide a pump of a noise suppression and vibration proof structure in which an air pump fixed to the side surface and the top surface of a fixed frame is inserted into housing whose absorption and interception effects of noise and vibration are excellent so that the noise and vibration caused by the air pump are significantly reduced and a fuel cell system using the same.

In order to achieve the foregoing and/or other objects of the present invention, according to a first aspect of the present invention, there is provided a fuel cell system comprising at least one electricity generator including an electrolyte membrane and an anode and a cathode attached to the both surfaces of the electrolyte membrane to generate electricity energy by the electrochemical reaction between fuel containing hydrogen and oxidant supplied to the anode and the cathode, a fuel supplying unit including a first pump for supplying the oxidant to the electricity generator, and a fixed frame that is provided on a lower frame and to which the first pump is fixed. The first pump is separated from the lower frame and is fixedly supported by a first fixing member combined with the fixed frame. The first fixing member is preferably a fixing member in the form of a belt. A buffering member is preferably inserted between the side surface of the first pump and the fixed frame.

Also, in the fuel cell system, the fuel supplying unit further comprises a second pump for supplying the fuel containing hydrogen to the electricity generator. At this time, the second pump is separated from the lower frame to be fixedly supported by a second fixing member to hang on the top surface of an upper fixed frame among the fixed frames. On the other hand, the second pump may be fixedly supported by the second fixing member on the sub-top/bottom surfaces or the sub-side surface of the sub-fixing frame combined with the fixed frame. In this case, it is possible to effectively absorb and reduce the vibration generated by the second pump by the combination structure between the fixed frame and the sub-fixed frame and the elasticity of the sub-fixed frame. Here, the second fixing member is a fixing member of a screw combination structure.

Also, in the fuel cell system, there is provided a structure in which the pumps fixed to the fixed frames are inserted into the housing having excellent noise suppression and vibration proof effect in addition to the pump fixation structure in which the pumps are fixed to the top/bottom surfaces or the side surfaces of the fixed frames.

The first pump preferably comprises a housing including double metal housing main bodies for absorbing and intercepting the noise generated therein and an inlet hole and an outlet hole for receiving and discharge a fluid and a pump inserted into the housing and including an inlet pipe to which the fluid is received and an outlet pipe that passes through the outlet hole and through which the received fluid is discharged with predetermined pressure. Here, the double metal housing main bodies comprise a porous first metal housing main body that converts the sound energy into heat energy to absorb noise and a second metal housing main body that surrounds the first metal housing main body to prevent the sound energy from being transmitted to the outside.

On the other hand, the first pump comprises a housing including housing main bodies formed of vacuum walls and having apertures and covers having an inlet hole and an outlet hole for receiving and discharging a fluid to cover the apertures of the housing main bodies and a pump inserted into the housing and including an inlet pipe to which the fluid is received and an outlet pipe that passes through the outlet hole and through which the received fluid is discharged with predetermined pressure.

Here, the noise that makes the user of the fuel cell uncomfortable is generated by the rotation of the motor in the air pump or pressure. The vibration vertical and horizontal reciprocating motion generated by the pumps by the rotation of the motor and in the air pump and the pressure. The vibration causes the noise.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
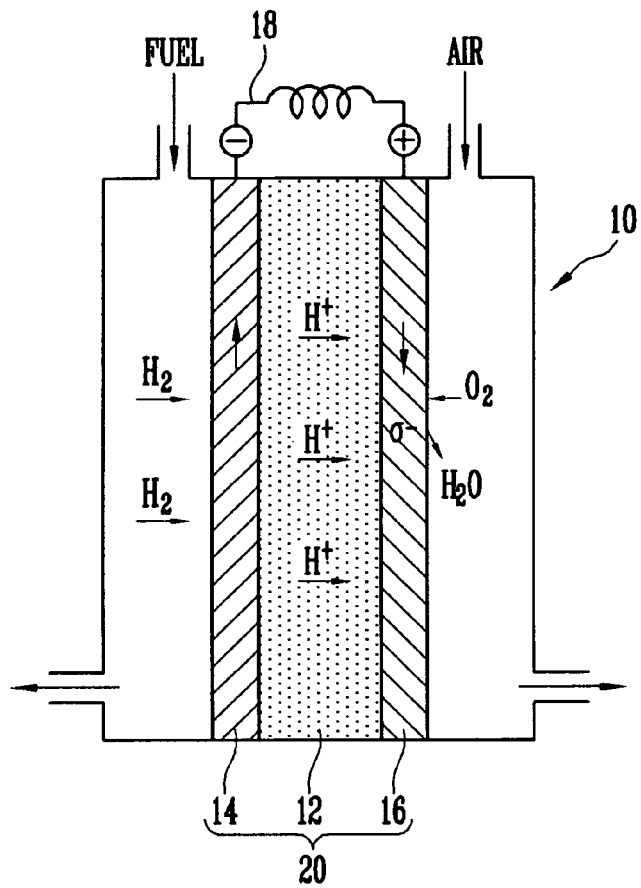
FIG. 1 illustrates an operation principle of a common fuel cell including polymer electrolyte membrane.

Hereinafter, preferred embodiments of the present invention will be described with reference to the attached drawings. In the drawings, the thickness and size of elements are exaggerated for clarity. The same reference numerals in different drawings represent the same element.

Figure 2:
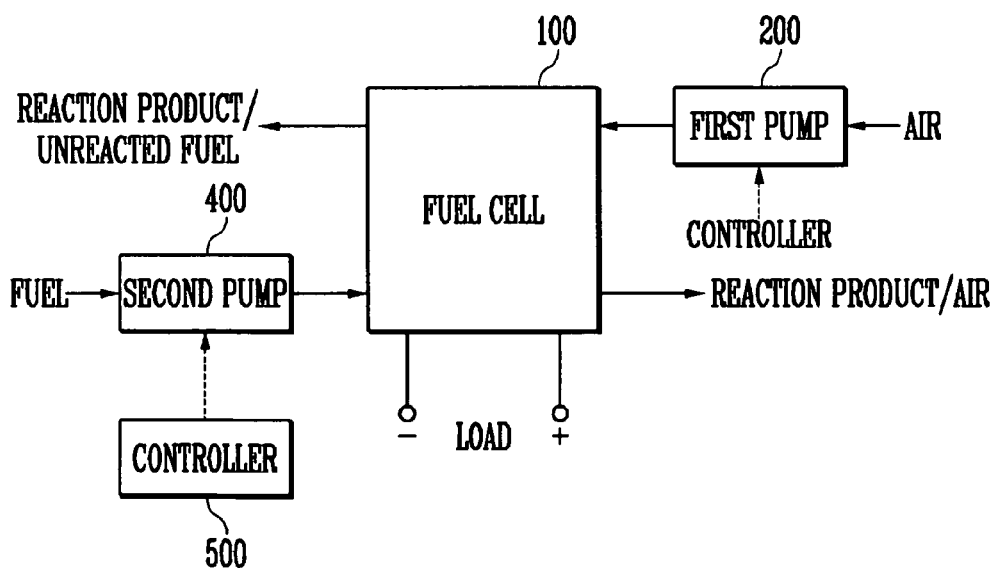
FIG. 2 is a block diagram schematically illustrating a fuel cell system according to the present invention.

FIG. 2 is a block diagram schematically illustrating a fuel cell system according to the present invention. Referring to FIG. 2, the fuel cell system significantly reduces vibration and noise generated by pumps using a pump fixation structure to be suitably used as a portable fuel cell, in particular, to be suitably used as a power source supply apparatus of an electronic apparatus such as a notebook computer and a camcorder.

The fuel cell system according to the present embodiment includes a fuel cell 100, a first pump 200, a second pump 400, and a controller 500.

To be specific, the fuel cell 100 includes at least one unit fuel cell (not shown) that generates electric energy. Here, the unit fuel cell is an electricity generator that generates predetermined voltage and current by an electrochemical reaction. The fuel cell 100 may include a structure in which a plurality of unit fuel cells are stacked. In this case, the fuel cell stack is commonly compressed and sealed up in order to prevent side effect from being generated by lack in oxygen therein.

The electricity generator is composed of a membrane-electrode assembly (MEA) that generates electric energy by oxidation and reduction between hydrogen and oxygen and a separator attached to the both surfaces of the MEA to transmit fuel containing hydrogen and oxygen or air to the MEA. The MEA includes polymer electrolyte membrane and an anode and a cathode attached to the both surfaces thereof. The separator may be omitted in accordance with the structure of the fuel cell 100. According to the above-described structure, the fuel cell 100 generates electric energy and discharges water and carbon dioxide obtained as reaction products. The fuel and air that do not react in the fuel cell 100 are discharged to the outside of the fuel cell 100 together with carbon dioxide and water. The fuel that does not react may be supplied to the fuel cell 100 again through a circulation path for recycling.

Also, the fuel cell 100 applies a predetermined voltage, for example, 24V to external load through the plurality of unit fuel cells serially connected to each other and/or connected to each other in parallel. At this time, the voltage applied from the fuel cell 100 to the external load is converted into a predetermined level by a power converting unit such as a DC-DC converter and then, may be applied as the predetermined voltage. Here, the external load includes electronic apparatuses such as a notebook computer, a satellite broadcasting receiver, a portable multimedia player (PMP), a portable digital video disc (DVD) player, a personal digital assistant (PDA), and a camcorder.

The first pump apparatus 200 is coupled to the cathode side of the fuel cell 100 to supply oxygen or air to the cathode in the fuel cell 100. The first pump apparatus 200 includes an air pump or a blower. The first pump apparatus 200 supplies enough air containing oxygen of no less than a required amount to the fuel cell 100 of the compressed and sealed structure in order to let the fuel cell 100 continuously operate.

The second pump apparatus 400 is coupled to the anode side of the fuel cell 100 to supply hydrogen or the fuel containing hydrogen (e.g., a hydrogen compound such as methanol or a mixed fuel in which a hydrogen compound such as methanol and water are mixed) stored in a fuel tank (not shown), for example, a mixed fuel in which hydrogen compound such as methanol or water and methanol are mixed with each other to the anode in the fuel cell 100. Here, the second pump apparatus 400 is a fuel pump.

The controller 500 controls the operations of the first and second pump apparatuses 200 and 400. The controller 500 applies control signals for turning on and off the operations of the first and second pump apparatuses 200 and 400 to the first and second pump apparatuses 200 and 400 in response to the start signal that requests the operation of the fuel cell 100. The controller 500 also controls at least one of various power source supply apparatuses such as a battery, a capacitor, a utility power source, and a fuel cell to be electrically connected to the first and second pump apparatuses 200 and 400 in order to supply required power to the first and second pumps 200 and 400. In this case, the controller 500 may connect at least one power source among the battery, the capacitor, and the utility power source to the first and second pump apparatuses 200 and 400 when the fuel cell 100 is initially driven and connect the fuel cell 100 as a power source to the first and second pumps 200 and 400 after the fuel cell 100 is normally driven.

Figure 3:
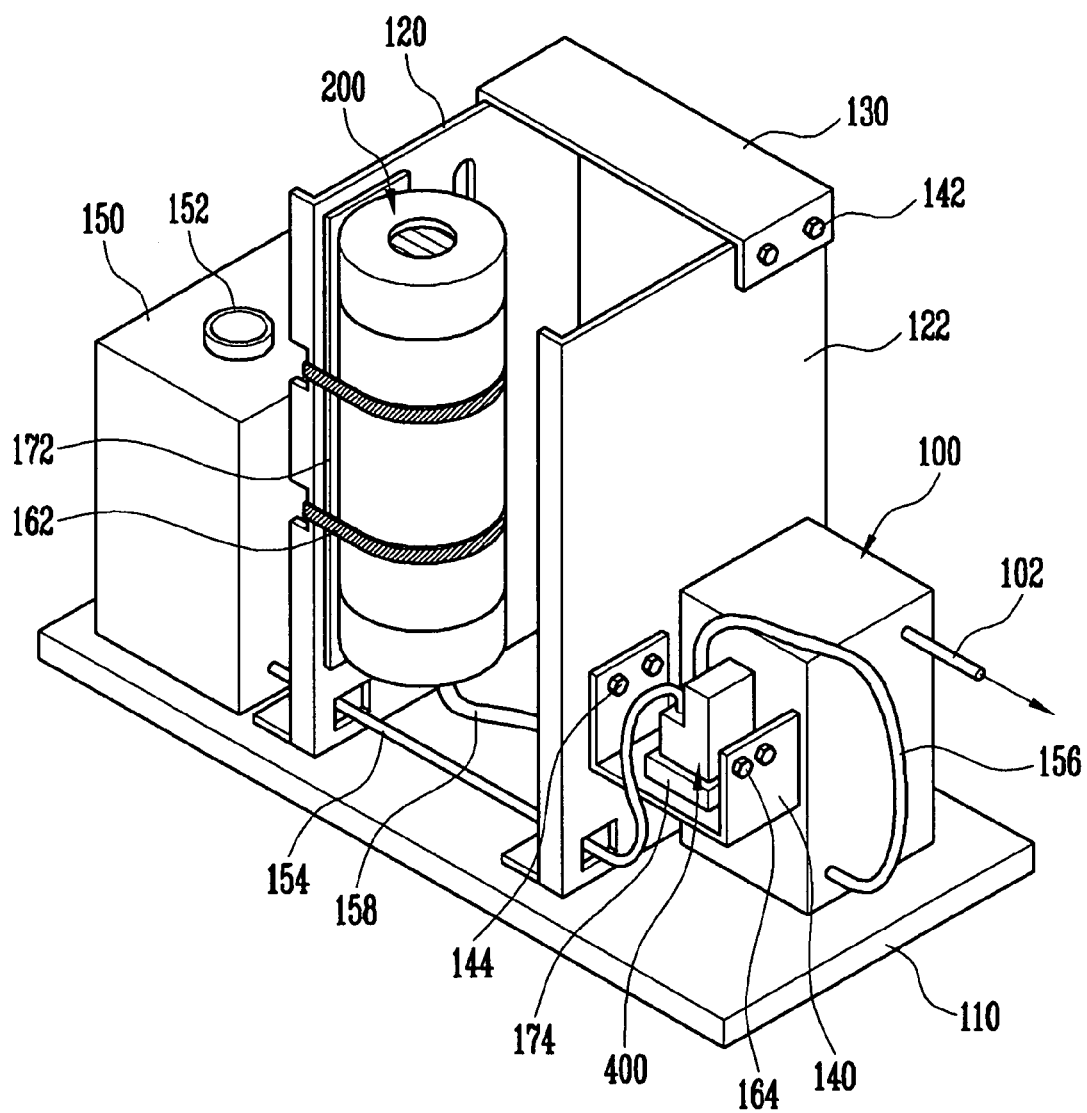
FIG. 3 is a perspective view illustrating a fuel cell system wherein a pump of a noise suppression and vibration proof structure according to a first embodiment of the present invention is used.

FIG. 3 is a perspective view illustrating a fuel cell system wherein a pump of a noise suppression and vibration proof structure is used according to a preferred embodiment of the present invention. The present embodiment is for facilitating the understanding of the pump fixation structure. In order to clearly and simply describe the present invention, other elements such as the controller and power sources in the fuel cell system are omitted.

Referring to FIG. 3, the fuel cell system according to the present embodiment includes a fuel cell 100, a lower frame 110, first and second vertical fixed frames 120 and 122, an upper fixed frame 130, a fuel tank 150, first to third channel pipes 154, 156, and 158, a first fixing member 162, a second fixing member 164, a first buffering member 172, a second buffering member 174, an air pump 200, and a fuel pump 400.

To be specific, the first and second vertical fixing frames 120 and 122 are fixedly provided on the lower frame 110 to be separated from each other by a predetermined distance. The upper fixed frame 130 is combined with a first combining member 142 such as a bolt and a nut on the frames 120 and 122 so that the first and second vertical fixed frames 120 and 122 are combined with each other.

The fuel cell 100 is provided in front of the second vertical fixed frame 122. A discharging pipe 102 for discharging reaction products such as the fuel that does not react in the fuel cell and carbon dioxide is provided in front of the fuel cell 100. Also, although not shown in FIG. 3, the fuel cell 100 includes an anode inlet and outlet 102 and a cathode inlet and outlet of the electricity generator that generates electric energy by the electrochemical reaction between hydrogen and oxygen. In FIG. 3, it is assumed that the cathode inlet and outlet is formed on the backside surface of the fuel cell 100.

The fuel tank 150 is provided behind the first vertical fixed frame 120. A fuel injection hole 152 for injecting fuel is formed on the fuel tank 150. The air pump 200 is fixed and supported by the belt-shaped first fixing member 162 on the side of the first vertical fixed frame 120. The air pump 200 is separated from the lower frame 110 by a predetermined distance. Also, a first buffering member 172 is inserted between the air pump 200 and the first vertical fixed frame 120. A porous flexible or elastic member such as a rubber plate may be used as the buffering member. Such a structure prevents the air pump from vibrating so that the vibration caused by the air pump 200 is not transmitted to the fuel cell system. In FIG. 3, an inlet hole through which the air flows is provided on the top surface of the air pump 200.

A sub-fixed frame 140 is fixedly combined with the side surface of the second vertical fixed frame 122 by a second combining member 144. The sub-fixed frame 140 has the elasticity because of its U-shaped.

The fuel pump 400 is placed on the sub-fixed frame 140 and is combined with one side surface of the sub-fixed frame 140 by the second fixing member 164 preferably with a screw combination structure. A second buffering member 174 is inserted on the bottom surface of the fuel pump 400. Although not shown in FIG. 3, an additional buffering member may be further inserted between the fuel pump 400 and one side surface of the sub-fixed frame 140 where the second fixing member 164 passes through the sub-fixed frame 140 to be screw combined with the fuel pump 400. Such a structure prevents the vibration of the fuel pump 400 from being transmitted to the fuel cell system.

The fuel containing hydrogen stored in the fuel tank 150 flows to the fuel pump 400 through the first channel pipe 154 and flows from the fuel pump 400 to the anode inlet of the fuel cell 100 through the second channel pipe 156. The air absorbed by the air pump 200 flows to the cathode of the fuel cell 100 through the third channel pipe 158 that extends from the bottom surface of the air pump 200. According to the above-described structure, the fuel cell system effectively prevents the vibration of the air pump and the fuel pump from being transmitted thereto.

Figure 4:
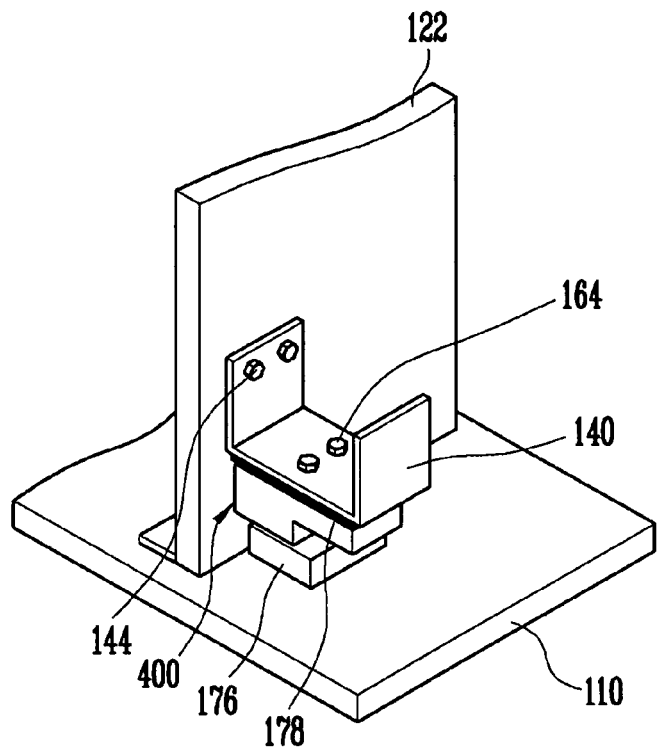
FIG. 4 is a partial perspective view illustrating another fixed structure of a fuel pump illustrated in the fuel cell system of FIG. 3.

FIG. 4 illustrates another fixation structure of the fuel pump illustrated in the fuel cell system of FIG. 3.

Referring to FIG. 4, the fuel pump 400 may be fixed to hang on the bottom surface of the sub-fixed frame 140 combined with the vertical fixed frame 122. At this time, a third buffering member 176 is inserted between the lower frame 110 and the fuel pump 400 and a fourth buffering member 178 such as a rubber plate is inserted between the bottom surface of the sub-fixed frame 140 and the fuel pump 400.

Alternatively, the fuel pump 400 may be fixed to hang on the bottom surface of the upper frame 130 using a similar structure to the above structure.

In the above two cases, it is possible to prevent the vibration of the fuel pump 400 from being transmitted to the fixed frames 120 and 130 while preventing the vibration of the fuel pump 400 from being transmitted to the lower frame 110. Therefore, it is possible to reduce the vibration and noise of the fuel cell system caused by the fuel pump 400.

Figure 5:
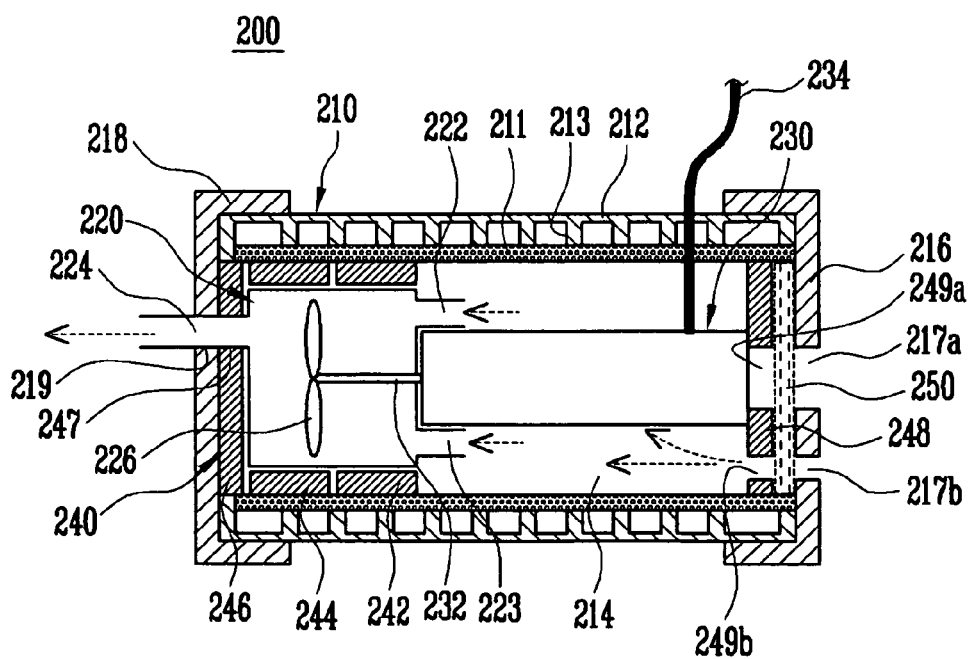
FIG. 5 is a sectional view illustrating an example of an air pump apparatus illustrated in the fuel cell system of FIG. 3.

FIG. 5 is a sectional view illustrating an example of the air pump of the fuel cell system according to an embodiment of the present invention.

Referring to FIG. 5, the air pump apparatus 200 with the noise suppression and vibration proof structure according to the present invention absorbs and intercepts sound energy so that the operation noise of the pumps provided in a housing 210 and the noise caused by the air that is received and discharged are not transmitted to the outside when oxygen or air is received and discharged. Therefore, the air pump apparatus 200 includes a housing 210, a pumping unit 220, a motor 230, a noise absorbing member 240, and a filter 250. Here, the pumping unit 220 and the motor 230 form the air pump. To be specific, the housing 210 includes cylinder-shaped double metal housing main bodies 211 and 212 and first and second covers 216 and 218 that cover the both openings of the double metal housing main bodies 211 and 212. The housing 210 in the form of a chamber absorbs and intercepts the sound energy in the inside 214 of the fuel cell system to minimize the noise of the pumps. The cylinder-shaped double metal housing main bodies 211 and 212 have a housing structure with excellent characteristics of absorbing and intercepting the sound energy. That is, the cylinder-shaped double metal housing main bodies 211 and 212 according to the present invention form the double structure housing 210 composed of a porous first metal housing main body and a second metal housing main body that surrounds that first metal housing main body.

The first metal housing main body 211 is formed of metal madreporite, that is, metal foam and is in the form of a cylinder whose top and bottom surfaces are opened. The first metal housing main body 211 is an aggregate of independent foams so that the foams form an interconnected network through minute cracks formed in barrier membranes that define the respective foams. According to such a structure, there is a friction between the wave surface of the barrier membrane and the sound wave so that sound energy is converted into heat energy. As a result, excellent noise absorbing effect is obtained. The metal foam that can be used as the first metal housing main body 211 is, for example, aluminum foam having an excellent light property, incombustibility, high strength, an excellent noise absorbing property, and an excellent moisture proof property.

The second metal housing main body 212 is in the form of a cylinder that surrounds the first metal housing main body 211. Also, the second metal housing main body 212 is formed of a high density member, that is, a metal member having higher noise absorbing effect than rubber or plastic. The second metal housing main body is preferably formed of metal with higher density than the first metal housing main body. The metal that can be used as the second metal housing main body 212 is, for example, aluminum having an excellent light property, incombustibility, high strength, an excellent noise absorbing property, and an excellent moisture proof property.

Also, the second metal housing main body 212 may be separated from the first metal housing main body 211 by a predetermined distance in order to improve the noise absorbing effect of the first metal housing main body 211. In this case, a barrier rib 213 having the height corresponding to the predetermined distance is formed on the internal surface of the second metal housing main body 212. The barrier rib 213 may be in the form of a protrusion, a stripe, or a mesh.

The first metal housing main body 211 and the second metal housing main body 212 may be directly connected to each other or form a predetermined space, for example, an air layer therebetween. Also, predetermined noise absorbing material pieces may be filled in the space between the first metal housing main body 211 and the second metal housing main body 212.

The first cover 216 is formed of a rubber member of a proper thickness to absorb the noise in the pump apparatus 200 and closely covers one end of the through-opening of the main bodies 211 and 212 in which an inlet hole is provided. That is, the first cover 216 is in the form of a circular plate to correspond to the shape of one end of the through-opening and includes two inlet holes 217a and 217b opened so that oxygen or air flows to the inlet pipes 222 and 223 of the pumping unit 220. The first cover 216 covers one end of the through-opening in the form of a square bracket seen from the section and supports the one opening of the housing 210.

The second cover 218 is formed of a rubber member of a proper thickness to absorb the noise in the pump 200 and closely covers the other end of the through-opening of the main bodies 211 and 212. That is, the second cover 218 is in the form of a circular plate to correspond to the shape of the other end of the through-opening of the housing and includes an outlet hole 219 through which the outlet pipe 224 of the pumping unit 220 passes. The second cover 218 covers the other end of the through-opening of the housing 210 in the form of a square bracket seen from the section and supports the other side of the housing 210.

The pumping unit 220 is a chamber that includes the inlet pipes 222 and 223 and the outlet pipe 224. The pumping unit 220 receives the external air through the inlet pipes 222 and 223 to discharge the received air through the outlet pipe 224. Therefore, the pumping unit 220 includes a propeller 226 that generates rotary power or pumping power. Here, the propeller 226 is an example of means for obtaining the rotary power or the pumping power. The propeller 226 is combined with the rotating shaft 232 of the motor 230 in the center thereof.

The motor 230 is driven by the electric energy supplied from the power source supply device outside the pump apparatus 200 such as the battery, the capacitor, the utility power source or the fuel cell. The motor 230 includes a power source line 234 connected to the electric motor and the power source supply device. Also, the motor 230 includes the rotating shaft 232 that transmits the rotary power of the motor 230 to the propeller 226. The power source line 234 is drawn to the outside through the holes formed in the first and second metal housing main bodies 211 and 212. The power source line 234 may be drawn to the outside through the first cover 216.

On the other hand, the pumping unit 220 and the motor 230 are an example of the air pump for compressing the air in the housing 210. The air pump including the noise proof structure according to an embodiment of the present invention can be easily realized by an application of a reciprocating mechanical apparatus, for example, an air pump using a piston reciprocating motion as well as by an application of a rotating mechanical apparatus using the above motor and propeller.

The noise absorbing member 240 surrounds the pumping unit 220 and the motor 230 in the housing 210. In order to effectively arrange the noise absorbing member 240 in the housing 210, the noise absorbing member 240 is divided into predetermined pieces 242, 244, 246, and 248. The first and second noise absorbing member pieces 242 and 244 are provided to surround the circular side surface of the pumping unit 220. The third noise absorbing member piece 246 includes a hole 247 corresponding to the outlet pipe 224 and is provided between the pumping unit 220 and the second cover 218. The fourth noise absorbing member piece 248 includes two holes 249a and 249b corresponding to the two inlet holes 217a and 217b of the first cover 216 and is provided between the motor 230 and the first cover 216.

The noise absorbing member 240 is formed of fiber material, elastic material, or elastic porous material having an excellent property of absorbing sound energy. The noise absorbing member 240 stably fixedly supports the pump inserted into the housing 210 as well as absorbs the noise in the housing 210.

The filter 250 purifies the air when the air is inputted into the inside 214 of the housing 210. That is, the filter 250 removes undesired components or gases that affect the fuel cell such as minute dusts, salt, and carbon dioxide included in the air. Therefore, the filter 250 is provided between the fourth noise absorbing member 248 and the first cover 216 and is supported and fixed by the fourth noise absorbing member 248 and the first cover 216. The filter 250 may be in the form of a circular sheet and a plurality of sheets may overlap each other. Any conventional filter may be used as the filter 250 only if the filter has an air purifying function.

Processes of manufacturing the air pump of the above noise suppression and vibration proof structure and of providing the air pump in the fuel cell system will be simply described as follows.

First, the cylindrical and porous first metal housing main body 211 having a first diameter is inserted into the cylindrical second metal housing main body 212 having a second diameter that is slightly larger than the first diameter. At this time, the first metal housing main body 211 is inserted into the opening of the second metal housing main body 212 to be fixed to the second metal housing main body 212 and is supported by the edge portion of the other end of the opening of the second metal housing main body 212. Here, the diameter of the other end of the opening of the second metal housing main body 212 is slightly smaller than the diameter of the one end of the opening of the second metal housing main body 212. In the process, the barrier rib 213 of the second metal housing main body 212 is coated with predetermined adhesive such as aluminum structure adhesive so that the first metal housing main body 211 and the second metal housing main body 212 can be fixedly combined with each other.

Next, the cylindrical chamber of the pumping unit 220 combined with the motor 230 is surrounded by the first and second noise absorbing members 242 and 244. At this time, the first and second noise absorbing members 242 and 244 are in the form of a ring having predetermined diameter and width to surround the chamber of the pumping unit 220.

Next, the motor 230 is inserted into the first metal housing main body 211 together with the pumping unit 220 surrounded by the first and second noise absorbing members 242 and 244. The power source line 234 combined with the motor 230 is drawn to the outside through the holes formed in the first and second metal housing main bodies 211 and 212 to pass through the first and second metal housing main bodies 211 and 212.

Next, the fourth noise absorbing member 248 is inserted to contact the motor 230 in the one end of the through-opening of the housing 210 that faces the inlet pipes 222 and 223 of the pumping unit 220. The third noise absorbing member 246 is inserted to contact the motor 230 in the other end of the through-opening of the housing 210 that faces the outlet pipe 224 of the pumping unit 220.

Next, the filter 250 for purifying the air is inserted to contact the fourth noise absorbing member 248 in the one end of the through-opening of the housing 210. The one side of the through-opening of each of the housing main bodies 211 and 212 is covered with the first cover 216 excluding the inlet holes 217a and 217b for receiving the air. The other end of the through-opening of the housing main bodies 211 and 212 are covered with the second cover 218 so that the outlet pipe 224 of the pumping unit 220 is exposed through the outlet hole 219. As a result, the air pump for the fuel cell having the noise suppression and vibration proof structure is simply manufactured.

Next, the air pump inserted into the housing having excellent noise suppression and vibration proof effect is fixed on the side surface of the fixed frame by a fixing member such as a belt to be separated from the lower frame of the fuel cell system by a predetermined distance. As a result, the fuel cell system having the noise suppression and vibration proof structure is completed.

Figure 6:
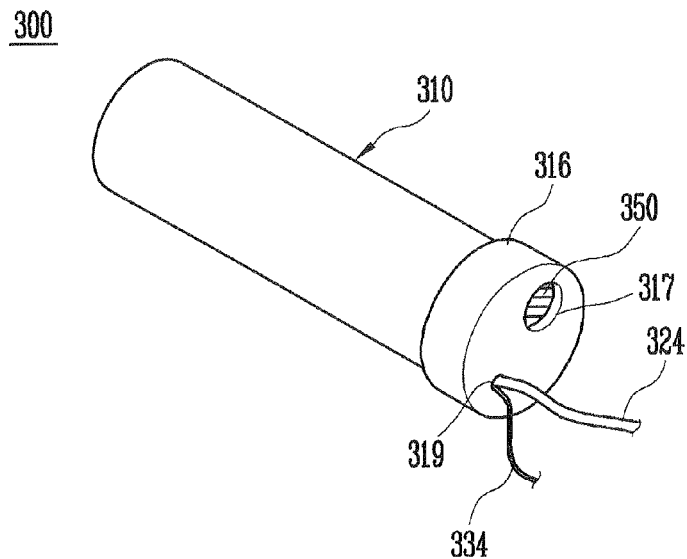
FIG. 6 is a perspective view illustrating another example of the air pump apparatus illustrated in the fuel cell system of FIG. 3.
Figure 7:
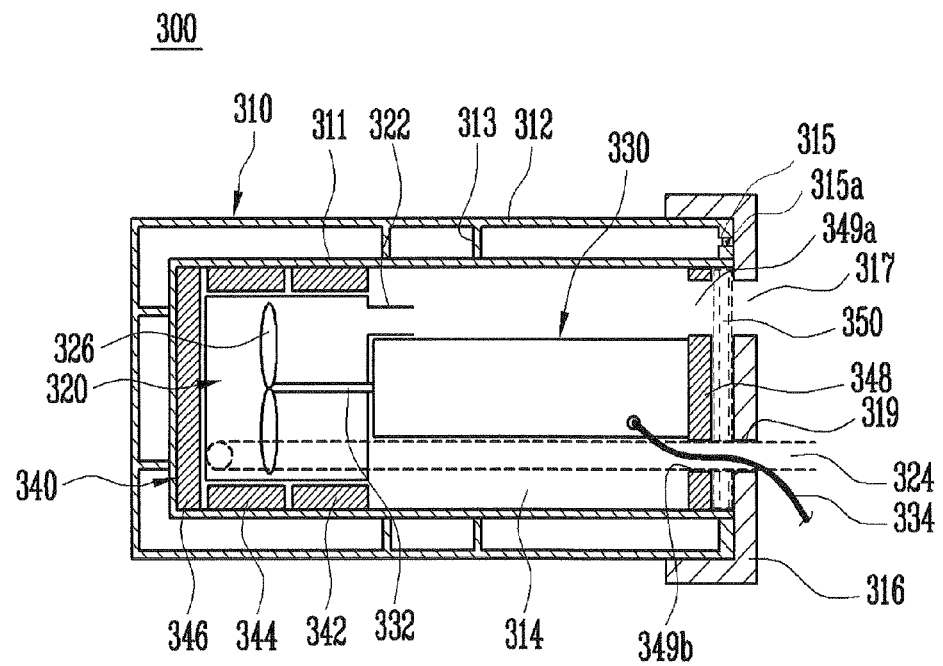
FIG. 7 is a sectional view illustrating another example of the air pump apparatus illustrated in the fuel cell system of FIG. 3.

FIGS. 6 and 7 are a perspective view and a sectional view illustrating another example of the air pump of the fuel cell system according to the embodiment of the present invention.

Referring to FIGS. 6 and 7, the air pump apparatus 300 having a noise suppression and vibration proof structure according to the present embodiment absorbs and intercepts sound energy generated therein so that the operation noise of the pumps provided in a housing 310 and the noise caused by the air that is received and discharged through the housing 310 are not transmitted to the outside when oxygen or air is received and discharged. Therefore, the air pump apparatus 300 includes a housing 310, a pumping unit 320, a motor 330, a noise absorbing member 340, and a filter 350. Here, the pumping unit 320 and the motor 330 form the air pump inserted into the housing 310.

To be specific, the housing 310 includes cylinder-shaped housing main bodies 311 and 312 and a cover 316 that covers an opening of the housing main bodies 311 and 312. The cylindrical housing main bodies 311 and 312 have a vacuum structure in which carrier such as the air is thin so that sound energy such as noise is not actually transmitted. That is, the cylindrical housing main bodies 311 and 312 according to the present embodiment are composed of the first housing main body 311 provided inside the housing 310 and the second housing main body 312 provided outside the first housing main body 311 with a vacuum space interposed between the first housing main body 311 and the second housing main body 312.

The first housing main body 311 is in the form of a cylinder having a predetermined diameter and includes an opening on one side. The first housing main body 311 is preferably formed of reinforced plastic and metal. Aluminum is used as the metal. Aluminum has an excellent light property, incombustibility, high strength, an excellent noise intercepting property, and an excellent water proof property. Therefore, aluminum is one of the materials that can be used as the housing main bodies of the present invention for preventing noise and vibration.

The second housing main body 312 is in the form of a cylinder having a diameter slightly larger than the diameter of the first housing main body 311. The second housing main body 312 is provided outside the first housing main body 311 so that the first housing main body 311 is inserted into the second housing main body 312 with the vacuum space interposed between the first housing main body 311 and the second housing main body 312. The second housing main body 312 is formed of the same material as the first housing main body 311.

Also, the second housing main body 312 includes a protrusion 313 of predetermined height so that the vacuum space is formed between the first housing main body 311 and the second housing main body 312. The protrusion 313 may be extended to a barrier rib in the form of a stripe or a mesh. Also, the protrusion 313 may not be integrated with the second housing main body 312 but may be integrated with the external surface of the first housing main body 311. The protrusion 313 of the minimum number and size is provided between the housing main bodies 311 and 312 so that the first and second housing main bodies 311 and 312 do not contact each other or are not transformed in the vacuum process and that the effect of preventing noise and vibration is not reduced.

Also, the second housing main body 312 is combined with the first housing main body 311 by predetermined adhering means after the first housing main body 311 is inserted into the second housing main body 312. Also, the second housing main body 312 includes an exhausting hole 315 for forming the vacuum space between the first and second housing main bodies 311 and 312. The exhausting hole 315 is sealed up by a predetermined sealing member 315a after an exhausting process for forming the vacuum space.

The cover 316 closely covers the opening of each of the housing main bodies 311 and 312. That is, the cover 316 in the form of a circular plate corresponding to the shape of the opening of each of the housing main bodies 311 and 312 covers the opening of each of the housing main bodies 311 and 312 in the form of a square bracket as illustrated in FIG. 7 and supports one side surface of the housing 310.

Also, the cover 316 is formed of synthetic resin or rubber of a proper thickness to absorb noise inside the housing 310. The cover 316 includes an inlet hole 317 through which a fluid, for example, the air is received and an outlet hole 319 through which the air compressed to predetermined pressure by the motor is discharged. Here, the air compressed by the pump is discharged to the outside of the pump 300 through the outlet pipe 324 that passes through the outlet hole 319.

The pumping unit 320 in the form of a chamber including the inlet pipe 322 and the outlet pipe 324 is provided in the housing 310. The pumping unit 320 receives the external air through the inlet pipe 322 and discharges the received air to the outlet pipe 324. Preferably, the pumping unit 320 includes a propeller 326 that generates rotary power or pumping power. Here, the propeller 326 is an example of means for obtaining the rotary power or the pumping power. The propeller 326 is combined with the rotating shaft 332 of the motor 330 in the center thereof.

The motor 330 is driven by the electric energy supplied from an additional power source supply device such as the battery, the capacitor, and the utility power source or the fuel cell. The motor 330 includes the rotating shaft 332 that transmits the rotary power generated by the motor 330 to the propeller 326. Also, the motor 330 includes a power source line 334 connected to the electric motor and the power source supply device. In FIG. 7, the power source line 334 is drawn from the motor 330 to the outside through the hole 349b of the noise absorbing member 348, the hole of the filter 350, and the outlet hole 319 of the cover 316.

The noise absorbing member 340 surrounds the pumping unit 320 and the motor 330 in the housing 310. In order to effectively arrange the noise absorbing member 340 in the housing 310, the noise absorbing member 340 is divided into predetermined pieces 342, 344, 346, and 348. The first and second noise absorbing member pieces 342 and 344 are provided to surround the circular side surface of the pumping unit 320. The third noise absorbing member piece 346 is provided on the side surface adjacent to the outlet pipe of the pumping unit 320. The fourth noise absorbing member piece 348 includes a hole 349a corresponding to the inlet hole 317 and a hole 349b through which the outlet pipe 324 of the pumping unit 320 passes and is provided between the motor 330 and the cover 316.

The filter 350 purifies the air when the air is inputted to the inside 314 of the housing 310. That is, the filter 350 removes undesired components or gases that affect the fuel cell such as minute dusts, salt, and carbon dioxide included in the air. Therefore, the filter 350 is provided between the fourth noise absorbing member 348 and the cover 316 in the opening of the housing 310 and is supported and fixed by the fourth noise absorbing member 348 and the cover 316. The filter 350 includes a hole through which the outlet pipe 324 of the pump 300 passes.

Processes of manufacturing the air pump of the above noise suppression and vibration proof structure and of providing the air pump in the fuel cell system will be simply described as follows.

First, the cylindrical first housing main body 311 having a first diameter is inserted into the cylindrical second housing main body 312 having a second diameter that is slightly larger than the first diameter so that the first housing main body 311 and the second housing main body 312 are combined with each other. Then, after the air between the first and second housing main bodies 311 and 312 is exhausted through the exhausting hole 315, the exhausting hole 315 is sealed up to seal up the housing 310.

Next, the third noise absorbing member 346 is provided on the bottom surface of the housing main body 311. At this time, the third noise absorbing member 346 may be replaced by small noise absorbing pieces.

Next, the cylindrical chamber of the pumping unit 320 is surrounded by the first and second noise absorbing members 342 and 344. The pumping unit 320 combined with the motor 330 is inserted into the housing main body 311 to contact the third noise absorbing member 346. When a space is generated between the pumping unit 320 and the housing main body 311, additional noise absorbing pieces are additionally inserted so that the pumping unit 320 is attached to the internal surface of the housing main body 311.

Next, the fourth noise absorbing member 348 is inserted into the housing main body 311 to contact the motor 330 and the filter 350 is inserted into the housing main body 311 to contact the fourth noise absorbing member 348. The opening of the housing main bodies 311 and 312 is covered with the cover 316. At this time, the outlet pipe 324 of the pump inserted into the housing 310 and the power source line 334 are drawn to the outside through the hole 349b of the fourth noise absorbing member, the hole of the filter 350, and the outlet hole 319 of the cover 316. As a result, the air pump having the noise proof structure is simply manufactured.

Next, the air pump inserted into the housing having excellent noise suppression and vibration proof effect is fixed on the side surface of the fixed frame by a fixing member such as a belt to be separated from the lower frame of the fuel cell system by a predetermined distance. As a result, the fuel cell system having the noise suppression and vibration proof structure is completed.

On the other hand, according to the above embodiment, the housing of the air pump is cylinder-shaped. However, the present invention is not limited to the above and the housing may be in the form of a box or in the form obtained by combining the box shape and the cylinder shape with each other.

Also, the fuel cell system according to the above embodiment is preferably formed of the PEMFC or the DMFC.

Although a few embodiments of the present invention have been shown and described, it would be appreciated by those skilled in the art that changes might be made in this embodiment without departing from the principles and spirit of the invention, the scope of which is defined in the claims and their equivalents.

As described above, the pumps mounted in the fuel cell system are fixed to the side surfaces and the top surfaces of the fixed frames so that it is possible to properly absorb and intercept the vibration of the pumps. Therefore, it is possible to significantly reduce the vibration of the fuel cell system. Also, the air pump fixed of the side surface and the top surface of the fixed frame is inserted into the double metal housings or the vacuum housing having excellent noise absorbing property so that it is possible to provide a fuel cell system with vibration and noise reduced compared with the conventional fuel cell system. Also, it is possible to improve the noise suppression and vibration proof characteristic of an application such as a notebook computer in which the fuel cell system is mounted.

What is claimed is:

1. A fuel cell system comprising:
    a lower frame;
    a first frame vertically mounted on the lower frame;
    a sub-frame mounted on a side of the first frame, wherein there is a space between a bottom of the sub-frame and the lower frame; and
    at least one electricity generator comprising an anode, a cathode, and an electrolyte membrane interposed between the anode and the cathode;
    a first pump apparatus for supplying an oxidant to the electricity generator; and
    a second pump apparatus for supplying a fuel to the electricity generator, the second pump apparatus mounted on the sub-frame, the second pump apparatus being not in direct contact with the lower frame, wherein there is a space between a bottom of the second pump apparatus and the lower frame.

2. The fuel cell system as claimed in claim 1, wherein the first pump apparatus is mounted on the first frame by a first fixing member.

3. The fuel cell system as claimed in claim 2, wherein the first fixing member has a form of a belt.

4. The fuel cell system as claimed in claim 1, wherein the first frame comprises a first vertical frame and a second vertical frame, the first pump apparatus is mounted on the first vertical frame by a first fixing member, there is a space between a bottom of the first pump apparatus and the lower frame, and the sub-frame is mounted on the second vertical frame.

5. The fuel cell system as claimed in claim 4, wherein the first fixing member has a form of a belt.

6. The fuel cell system as claimed in claim 4, further comprising a first buffering member inserted between the first pump apparatus and the first vertical frame.

7. The fuel cell system as claimed in claim 1, wherein the second pump apparatus is mounted on a top surface of the sub-frame, and a second buffering member is inserted between the second pump apparatus and the top surface of the sub-frame.

8. The fuel cell system as claimed in claim 1, wherein the second pump apparatus is mounted on a bottom surface of the sub-frame, a second buffering member is inserted between the second pump apparatus and the bottom surface of the sub-frame, and a third buffering member inserted between the second pump apparatus and the lower frame.

9. A fuel cell system, comprising:
    a lower frame;
    a first frame vertically mounted on the lower frame;
    a second frame vertically mounted on the lower frame;
    at least one electricity generator comprising an anode, a cathode, and an electrolyte membrane interposed between the anode and the cathode;
    a first pump apparatus for supplying an oxidant to the electricity generator, the first pump apparatus mounted on the first frame by a first fixing member, the first pump apparatus being not directly in contact with the lower frame, wherein there is a space between a bottom of the first pump apparatus and the lower frame; and
    a second pump apparatus for supplying a fuel to the electricity generator, the second pump apparatus mounted on the second frame, the second pump apparatus being not directly in contact with the lower frame, wherein there is a space between a bottom of the second pump apparatus and the lower frame.

10. The fuel cell system as claimed in claim 9, wherein the first fixing member has a form of a belt.

11. The fuel cell system as claimed in claim 9, further comprising a sub-frame for mounting the second pump apparatus, wherein there is a space between a bottom of the sub-frame and the lower frame, and the second pump apparatus is mounted via the sub-frame.

12. The fuel cell system as claimed in claim 11, further comprising:
    a first buffering member inserted between the first pump apparatus and the first frame; and
    a second buffering member inserted between the second pump apparatus and the sub-frame.

* * * * *